United States Patent
Chen (10) Patent No.: US 9,772,800 B2
(45) Date of Patent: Sep. 26, 2017

(54) UNIVERSAL SERIAL BUS CONTROLLER AND WIRING SUBSTRATE

(71) Applicant: GENESYS LOGIC, INC., New Taipei (TW)

(72) Inventor: Chiu-Chien Chen, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 276 days.

(21) Appl. No.: 14/643,391

(22) Filed: Mar. 10, 2015

(65) Prior Publication Data

US 2016/0100500 A1    Apr. 7, 2016

(30) Foreign Application Priority Data

Oct. 3, 2014  (TW) .............................. 103134683 A (51) Int. Cl.
*G06F 13/38* (2006.01)
*G06F 3/06* (2006.01)

(52) U.S. Cl.
CPC .................................. *G06F 3/0661* (2013.01)

(58) Field of Classification Search
None
See application file for complete search history.

(56) References Cited

U.S. PATENT DOCUMENTS

| 6,891,275 B2 * | 5/2005 | Lane ................. H01L 23/49838 257/737 |
| 2008/0005395 A1 | 1/2008 | Ong |
| 2015/0341013 A1 | 11/2015 | Vemula et al. |

FOREIGN PATENT DOCUMENTS

| TW | 296760 B | 5/2008 |
| TW | 334546 B | 12/2010 |

* cited by examiner

*Primary Examiner* — Cheng-Yuan Tseng
(74) *Attorney, Agent, or Firm* — Hauptman Ham, LLP (57) ABSTRACT

A universal serial bus controller and host are adapted for being electrically connected to a universal serial bus device. The universal serial bus host includes: a wiring substrate including a plurality of first substrate contacts and a plurality of second substrate contacts; a universal serial bus connecting port disposed on the wiring substrate via the first substrate contacts; and the universal serial bus controller including a plurality of pins electrically connected to the wiring substrate via the second substrate contacts. The universal serial bus controller and the host can decrease interferences among signals and avoid the complicated layout of the wiring substrate.

16 Claims, 6 Drawing Sheets

PRIOR ART

UNIVERSAL SERIAL BUS CONTROLLER AND WIRING SUBSTRATE

BACKGROUND OF THE INVENTION

1. Field of the Invention

The present invention generally relates to a field of universal serial bus, and more particularly to a universal serial bus controller and a universal serial bus host with a specific pin arrangement which is designed according to USB standards.

2. Description of Prior Art

Universal Serial Bus (hereinafter referred to as "USB") is an interface which is currently widely used Nowadays, the USB 3.0 standard has been developed. The signal transmission rate of USB 3.0 standard can reach 5 Gbps (Gigabit per second).

Furthermore, USB Implementers Forum (USB-IF) has released a connection interface of USB 3.1 standard. In USB 3.1 standard, a Type-C interface has a signal transmission rate of 10 Gbps. A connector with the Type-C interface can be inserted into a corresponding device in both orientations when the connector with the Type-C interface is utilized.

Figure 1:
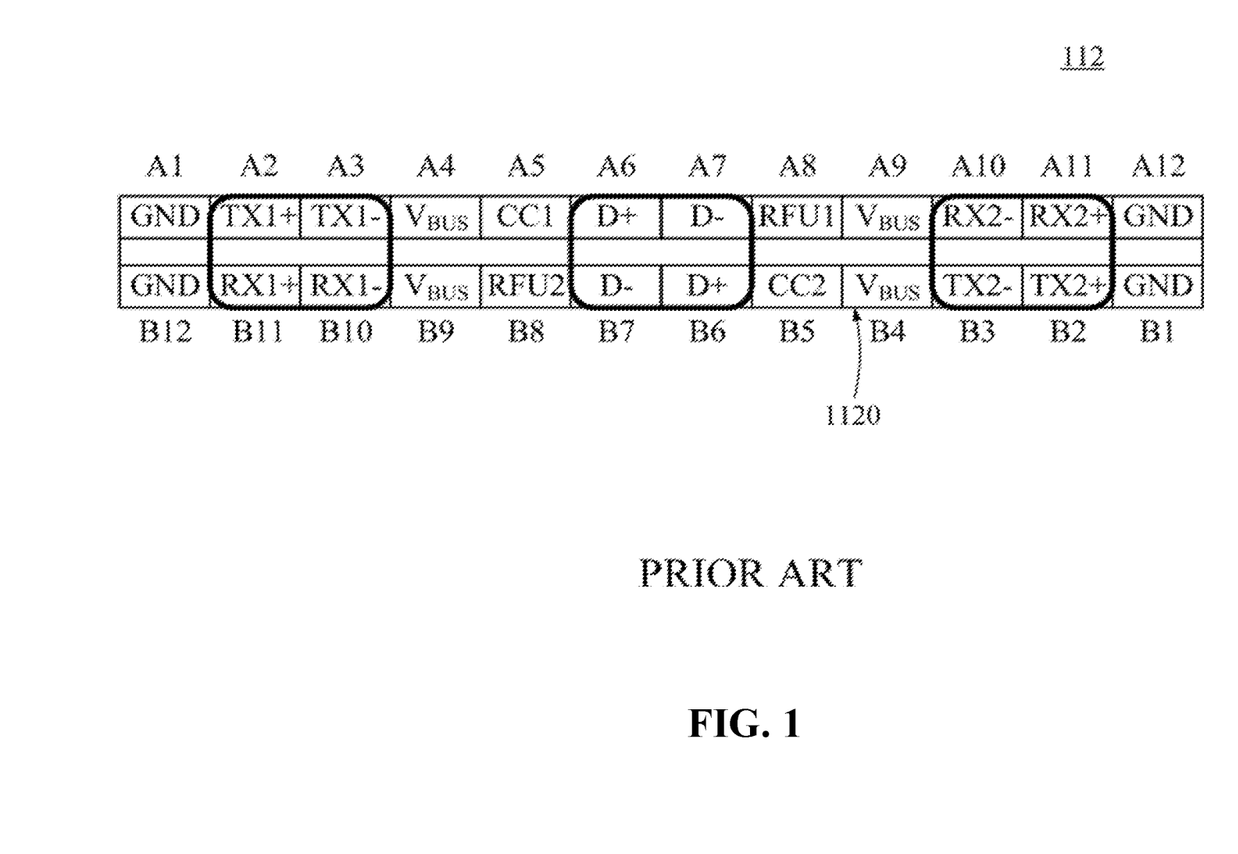
FIG. 1 illustrates the definition of the connecting port signal contacts with the Type-C interface of USB 3.1 standard.

In general, a USB connecting system comprises a USB device connected to a USB host via a USB cable. The USB host comprises a wiring substrate, a USB connecting port, and a USB controller which are disposed on the wiring substrate. The USB device is connected to the USB connecting port via a USB connector at one end of the USB cable, so as to be electrically connected to the USB controller on the wiring substrate. Since both USB 3.0 standard and USB 3.1 standard have a high signal transmission rate, a high operating frequency is required. However, in the Type-C interface of USB standard released by the USB-IF, a first group of connecting port signal contacts and a second group of connecting port signal contacts are disposed in both the USB connector and the USB connecting port with the Type-C interface, so as to meet the demand that the USB connector can be inserted into the USB connecting port in both orientations by a user. When the USB connector is electrically connected to the USB connecting port, one of the first and second groups of connecting port signal contacts can provide signal transmission. Each of the first and second groups of connecting port signal contacts at least comprises a set of transmitting signal contacts, a set of receiving signal contacts, and a set of differential signal contacts. As shown in FIG. 1, the USB connector 112 with the Type-C interface comprises a flat board 1120 disposed therein. A-side contacts A1-A12 and B-side contacts B1-B12 are respectively disposed at two sides of the flat board 1120. A2, A3, A6, A7, B11, and B10 are the transmitting signal contacts, the differential signal contacts, and the receiving signal contacts of the first group of connecting port signal contacts. A1 and B12 are ground contacts of the first group of connecting port signal contacts. A4 and B9 are power contacts of the first group of connecting port signal contacts. A10, A11, B2, B3, B6, and B7 are the receiving signal contacts, the transmitting signal contacts, and the differential signal contacts of the second group of connecting port signal contacts. B1 and A12 are ground contacts of the second group of connecting port signal contacts. B4 and A9 are power contacts of the second group of connecting port signal contacts.

However, USB 3.0 standard and USB 3.1 standard have reached the high-speed signal transmission rate of 5 Gbps and 10 Gbps. During a high-speed transmission, interferences among signals significantly affect a transmission performance of the above-mentioned system, especially when a handshaking process is implemented between the USB device and the USB controller. The handshaking process might fail due to a misjudgment of a state machine caused by the interferences among the signals. That is, the USB device fails to be electrically connected to the USB controller. Furthermore, in the standard contact definition of the USB connecting port with the Type-C interface, the interferences among the signals easily occurs because the transmitting signal contacts are too close to the USB controller. Consequently, there is a need to solve the problem of the interference among the signals in the transmission path between the USB device and the USB controller.

SUMMARY OF THE INVENTION

The present invention provides a USB controller capable of solving the problem of the interferences among the signals in the prior art.

The present invention provides a USB host capable of solving the problem of the interferences among the signals and simplifying layout of a wiring substrate in the prior art.

A universal serial bus controller of the present invention is adapted for being electrically connected to a universal serial bus connecting port. The universal serial bus connecting port comprises a flat board and a first group of connecting port signal contacts and a second group of connecting port signal contacts which are respectively disposed at a first side and a second side of the flat board. The first group of connecting port signal contacts comprises a first set of transmitting signal contacts, a first set of receiving signal contacts, and a first set of differential signal contacts. The second group connecting port signal contacts comprises a second set of transmitting signal contacts, a second set of receiving signal contacts, and a second set of differential signal contacts. The universal serial bus controller comprises a universal serial bus controller chip and a substrate. The universal serial bus controller chip comprises a plurality of chip contacts. The substrate is utilized for supporting the universal serial bus controller chip and comprises a plurality of pins electrically connected to the chip contacts. The pins comprise a first group of pins and a second group of pins. The first group of pins comprises a first set of pins corresponding to the first set of transmitting signal contacts, a second set of pins corresponding to the first set of receiving signal contacts, and a third set of pins corresponding to the first set of differential signal contacts. The second group of pins comprises a fourth set of pins corresponding to the second set of transmitting signal contacts, a fifth set of pins corresponding to the second set of receiving signal contacts, and a sixth set of pins corresponding to the second set of differential signal contacts. The pins are arranged in one row. The first group of pins and the second group of pins are adjacently arranged in groups. The sets of pins in each of the first group and the second group of pins are adjacently arranged in sets. Two adjacent sets of pins are respectively corresponding to the connecting port signal contacts at the first side and the second side of the flat board.

A universal serial bus controller of the present invention is adapted for being electrically connected to a universal serial bus connecting port. The universal serial bus connecting port comprises a flat board and a first group of connecting port signal contacts and a second group of connecting port signal contacts which are respectively disposed at a first side and a second side of the flat board. The first group of connecting port signal contacts comprises a first set of transmitting signal contacts, a first set of receiving signal contacts, and a first set of differential signal contacts. The second group of connecting port signal contacts comprises a second set of transmitting signal contacts, a second set of receiving signal contacts, and a second set of differential signal contacts. The universal serial bus controller comprises a universal serial bus controller chip and a substrate. The universal serial bus controller comprises a plurality of chip contacts. The substrate is utilized for supporting the universal serial bus controller chip and comprises a plurality of pins electrically connected to the chip contacts. The pins comprise a first group of pins, a second group of pins, and a third set of pins. The first group of pins comprises a first set of pins corresponding to the first set of transmitting signal contacts and a second set of pins corresponding to the first set of receiving signal contacts. The third set of pins is corresponding to the first set of differential signal contacts and the second set of differential signal contacts. The second group of pins comprises a fourth set of pins corresponding to the second set of transmitting signal contacts and a fifth set of pins corresponding to the second set of receiving signal contacts. The third set of pins is disposed between the first group of pins and the second group of pins for separating the first group of pins from the second group of pins.

A universal serial bus host of the present invention is adapted for being electrically connected to a universal serial bus device. The universal serial bus host comprises a wiring substrate, a universal serial bus connecting port, and a universal serial bus controller. The wiring substrate comprises a plurality of first substrate contacts and a plurality of second substrate contacts. The universal serial bus connecting port comprises a flat board and a plurality of connecting port signal contacts disposed at a first side and a second side of the flat board. The universal serial bus connecting port is electrically connected to the wiring substrate via the first substrate contacts. The connecting port signal contacts comprise a first set of transmitting signal contacts, a first set of receiving signal contacts, a first set of differential signal contacts, a second set of transmitting signal contacts, a second set of receiving signal contacts, and a second set of differential signal contacts. The universal serial bus controller comprises a plurality of pins disposed on the wiring substrate via the second substrate contacts and is electrically connected to the wiring substrate and the universal serial bus connecting port. The first substrate contacts are disposed in one row and comprise a first set of substrate contacts corresponding to the first set of transmitting signal contacts, a second set of substrate contacts corresponding to the first set of receiving signal contacts, a third set of substrate contacts corresponding to the first set of differential signal contacts, a fourth set of substrate contacts corresponding to the second set of transmitting signal contacts, a fifth set of substrate contacts corresponding to the second set of receiving signal contacts, and a sixth set of substrate contacts corresponding to the second set of differential signal contacts. The sets of substrate pins are adjacently disposed in sets. Two adjacent sets of substrate contacts are respectively corresponding to the connecting port signal contacts at the first side and the second side of the universal serial bus connecting port.

A wiring substrate of the present invention is adapted for being electrically connected to a universal serial bus connecting port and a universal serial bus controller. The universal serial bus connecting port comprises a flat board and a plurality of connecting port signal contacts disposed at a first side and a second side of the flat board. The wiring substrate comprises a plurality of first substrate contacts and a plurality of second substrate contacts. The first substrate contacts are electrically connected to the universal serial bus connecting port, disposed in one row, and comprise a first set of substrate contacts, a second set of substrate contacts, a third set of substrate contacts, a fourth set of substrate of contacts, a fifth set of substrate contacts, and a sixth set of substrate contacts. Two adjacent sets of substrate contacts are respectively corresponding to the connecting port signal contacts at the first side and the second side of the flat. The second substrate contacts are electrically connected to the universal serial bus controller and corresponding to the first set substrate contacts, the second set substrate contacts, the third set of substrate contacts, the fourth set of substrate contacts, the fifth set of substrate contacts, and the sixth set of substrate contacts.

The USB host of the present invention is capable of decreasing the interference among the signals when the USB host and the USB connecting port are utilized. Furthermore, the present invention is capable of avoiding the problem that the layout of the wiring substrate is too complicated and decreasing the manufacturing cost of the wiring substrate.

DETAILED DESCRIPTION OF THE INVENTION

Figure 2:
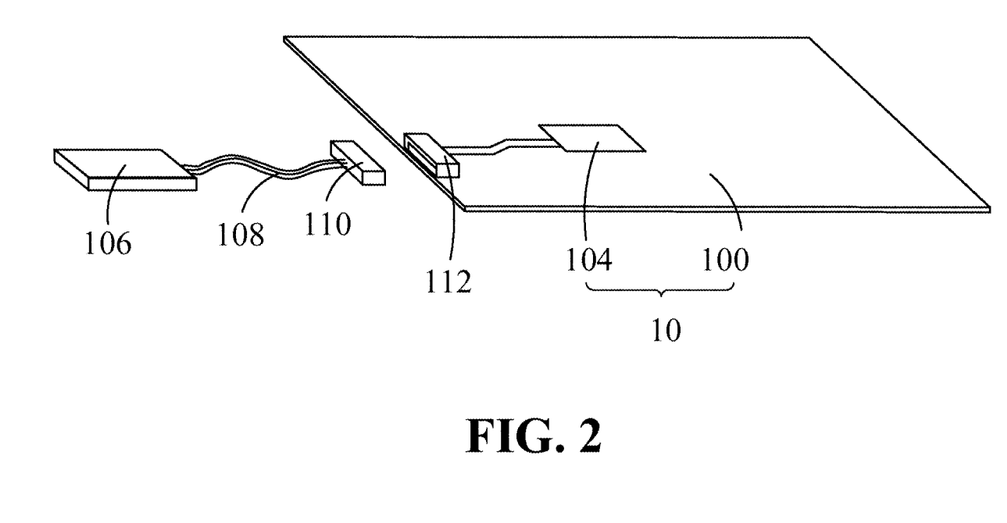
FIG. 2 illustrates a USB connecting system comprising a USB device and a USB host in accordance with the present invention.
Figure 3A:
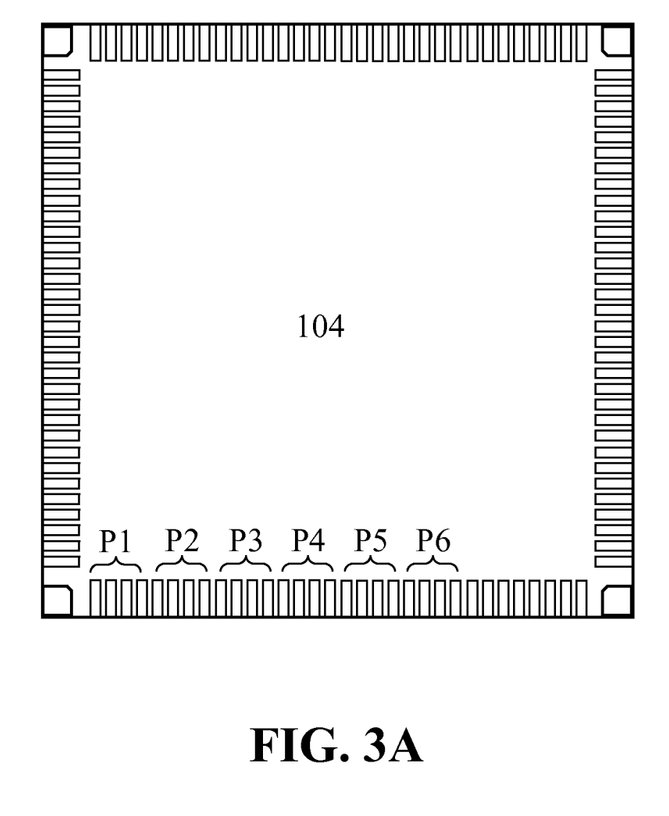
FIG. 3A illustrates a USB controller including one row of pins in accordance with a first embodiment of the present invention.

Please refer to FIG. 2 and FIG. 3A. FIG. 2 illustrates a USB connecting system comprising a USB device 106 and a USB host 10 in accordance with an embodiment of the present invention. The USB host 10 comprises a USB controller 104 disposed on a wiring substrate 100 and a USB connecting port 112 disposed on the wiring substrate 100 and electrically connected to USB controller 104. The USB device 106 is electrically connected to the USB connecting port 112 via a USB connecting port 110 of a connecting cable 108. The USB host 10 and the USB device 106 constitute the USB connecting system. FIG. 3A illustrates the USB controller 104 in accordance with a first embodiment of the present invention. The USB controller 104 of the present embodiment is adapted for being disposed on the wiring substrate 100 and electrically connected to the USB connecting port 112 in FIG. 2. More particularly, the USB controller 104 is adapted for the Type-C interface of USB 3.1 standard in FIG. 1.

Please refer to FIG. 1. The USB connecting port 112 with the Type-C interface comprises a flat board 1120 disposed therein. A first side (hereinafter referred to as "A side") of the flat board 1120 comprises A-side contacts A1-A12, and a second side (hereinafter referred to as "B side") of the flat board 1120 comprises B-side contacts B1-B12. The USB connecting port 112 is disposed on the wiring substrate 100 via a plurality of first substrate contacts 130 in FIG. 5. The USB controller 104 is disposed on the wiring substrate 100 via a plurality of second substrate contacts 140 in FIG. 5. The USB connecting port 112 is electrically connected to the USB controller 104 via the wiring substrate 100. The USB controller comprises a plurality of pins corresponding to the 24 contacts (i.e. the A-side contacts A1-A12 and the B-side contacts B1-B12) in the USB connecting port 112 in FIG. 1. The contacts in the USB connecting port 112 comprise a first group of connecting port signal contacts and a second group of connecting port signal contacts. The first group of connecting port signal contacts comprises a first set of transmitting signal contacts, a first set of receiving signal contacts, and a first set of differential signal contacts. The second group of connecting port signal contacts comprises a second set of transmitting signal contacts, a second receiving signal contacts, and a second differential signal contacts. Furthermore, it is noted that the USB controller 104 of the present embodiment has a specific pin arrangement for solving the problem of the interferences among the signals in the conventional USB connecting system and simplifying the layout of the wiring substrate 100 which is utilized for electrically connecting the USB controller 104 and the USB connector 112. More particularly, the present invention can decrease the interferences among the signals and avoid the layout of the wiring substrate 100 being too complicated.

Figure 3B:
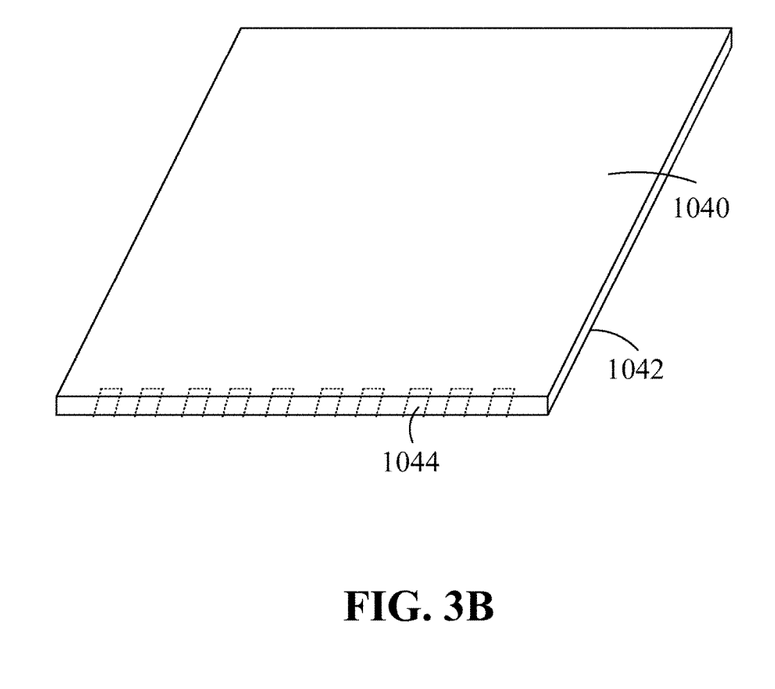
FIG. 3B illustrates a USB controller chip and a substrate.

Please refer to FIG. 3A and FIG. 3B. FIG. 3A illustrates a pin arrangement of the USB controller 104 in accordance with the present embodiment. FIG. 3A illustrates that pins are exposed after a USB controller chip is packaged. A package type of the USB controller chip may be one selected from a group consisting of a quad flat no-lead (QFN) package, a ball grid array (BGA) package, and a land grid array (LGA) package, but is not limited to the above-mentioned package types. FIG. 3B illustrates a USB controller chip 1040 and a substrate 1042. The USB controller 104 comprises the USB controller chip 1040 disposed on the substrate 1042. The substrate 1042, for example, may be a lead frame, a wiring substrate, or a ceramic substrate. The USB controller chip 1040 comprises a plurality of chip contacts 1044 which are electrically connected to the pins in FIG. 3A via wirings. The wirings may be made of conductive materials, such as gold wirings, copper wirings, and so on. A sealing body covers the UBS controller chip 1040, the wirings, and a part of the substrate 1042 and exposes the pins. The pins are electrically connecting the USB controller 104 to the wiring substrate 100 with a soldering method. The pins in FIG. 3A comprise a first group of pins and a second group of pins. The first group of pins comprises a first set of pins P1, a second set of pins P2, and a third set of pins P3. The second group of pins comprises a fourth set of pins P4, a fifth set of pins P5, and a sixth set of pins P6. It is noted that only some chip contacts 1044 are shown in FIG. 3B. In practice, a number of the chip contacts 1044 in FIG. 3B are corresponding to a number of the pins in FIG. 3A.

The first set of pins P1 is corresponding to the first set of transmitting signal contacts of the USB connecting port 112 in FIG. 1, that is, corresponding to the A-side contacts A1-A4 of the USB connecting port 112. The second set of pins P2 is corresponding to the first set of receiving signal contacts of the USB connecting port 112 in FIG. 1, that is, corresponding to the B-side contacts B9-B12 of the USB connecting port 112. The third set of pins P3 is corresponding to the first set of differential signal contacts of the USB connecting port 112 in FIG. 1, that is, corresponding to the A-side contacts A5-A8 of the USB connecting port 112. The fourth set of pins P4 is corresponding to the second set of differential signal contacts of the USB connecting port 112 in FIG. 1, that is, corresponding to the B-side contacts B5-B8 of the USB connecting port 112. The fifth set of pins P5 is corresponding to the second set of receiving signal contacts of the USB connecting port 112 in FIG. 1, that is, corresponding to the A-side contacts A9-A12 of the USB connecting port 112. The sixth set of pins P6 is corresponding to the second set of transmitting signal contacts of the USB connecting port 112 in FIG. 1, that is, corresponding to the B-side contacts B1-B4 of the USB connecting port 112.

A feature of the present embodiment is that the pins of the USB controller 104 corresponding to the USB connecting port 112 in FIG. 1 are arranged in one row. Preferably, the first group of pins and the second group of pins are adjacently arranged in groups, so as to avoid the problem that it is difficult to implement the layout of the pins on the wiring substrate 100. In each of the groups of pins, the pins are adjacently arranged in sets. Two adjacent sets of pins are respectively corresponding to the connecting port signal contacts at different sides of the flat board 1120 of the USB connecting port 112. For example, a sequence of the pins of the USB controller 104 is the first set of pins P1 (the first group of pins), the second set of pins P2 (the first group of pins), the third set of pins P3 (the first group of pins), the fourth set of pins P4 (the second group of pins), the fifth set of pins P5 (the second group of pins), and the sixth set of pins P6 (the second group of pins). The second set of pins P2 and the third set of pins P3 adjacent to each other are respectively corresponding to the B-side contacts B9-B12 of the second side (B side) and the A-side contacts A5-A8 of the first side (A side). Preferably, two adjacent pins in two adjacent sets of pins are non-controlling signal pins, for example, ground pins or power pins, so as to generate a shielding effect and reduce the interferences among the signals of the sets of pins.

Furthermore, it is noted that the sequence of the pin arrangement of the USB controller 104 is not limited to the sequence shown in FIG. 3A. For example, another sequence may be the third set of pins P3 (the first group of pins), the second set of pins P2 (the first group of pins), the first set of pins P1 (the first group of pins), the fourth set of pins P4 (the second group of pins), the fifth set of pins P5 (the second group of pins), and the sixth set of pins P6 (the second group of pins). As long as the first group of pins and the second group of pins are adjacently arranged in groups and two adjacent sets of pins are respectively corresponding to the connecting port signal contacts at different sides of the flat board 1120 of the USB connecting port 112, the interferences among the signals may be reduced and the layout between the USB controller 104 and the USB connecting port 112 in FIG. 1 is not complicated.

After many experiments, the interferences among the signals are lowest and the layout is simplest when the sequence of the pin arrangement of the USB controller 104 is the first set of pins P1 (the first group of pins), the second set of pins P2 (the first group of pins), the third set of pins P3 (the first group of pins), the fourth set of pins P4 (the second group of pins), the fifth set of pins P5 (the second group of pins), and the sixth set of pins P6 (the second group of pins).

Please refer to FIG. 1 and FIG. 3A. The first set of pins P1 is corresponding to the A-side contacts A1-A4 of the USB connecting port 112 and comprises GND, TX1+, TX1−, and VBUS. The second set of pins P2 is corresponding to the B-side contacts B9-B12 of the USB connecting port 112 and comprises VBUS, RX1−, RX1+, and GND. The third set of pins P3 is corresponding to the A-side contacts A5-A8 of the USB connecting port 112 and comprises CC1, D+, D−, and RFU1. The fourth set of pins P4 is corresponding to the B-side contacts B5-B8 of the USB connecting port 112 and comprises CC2, D+, D−, and RFU2. The fifth set of pins P5 is corresponding to the A-side contacts A9-A12 of the USB connecting port 112 and comprises VBUS, RX2−, RX2+, and GND. The sixth set of pins P6 is corresponding to the B-side contacts B1-B4 of the USB connecting port 112 and comprises GND, TX2+, TX2−, and VBUS.

Figure 4:
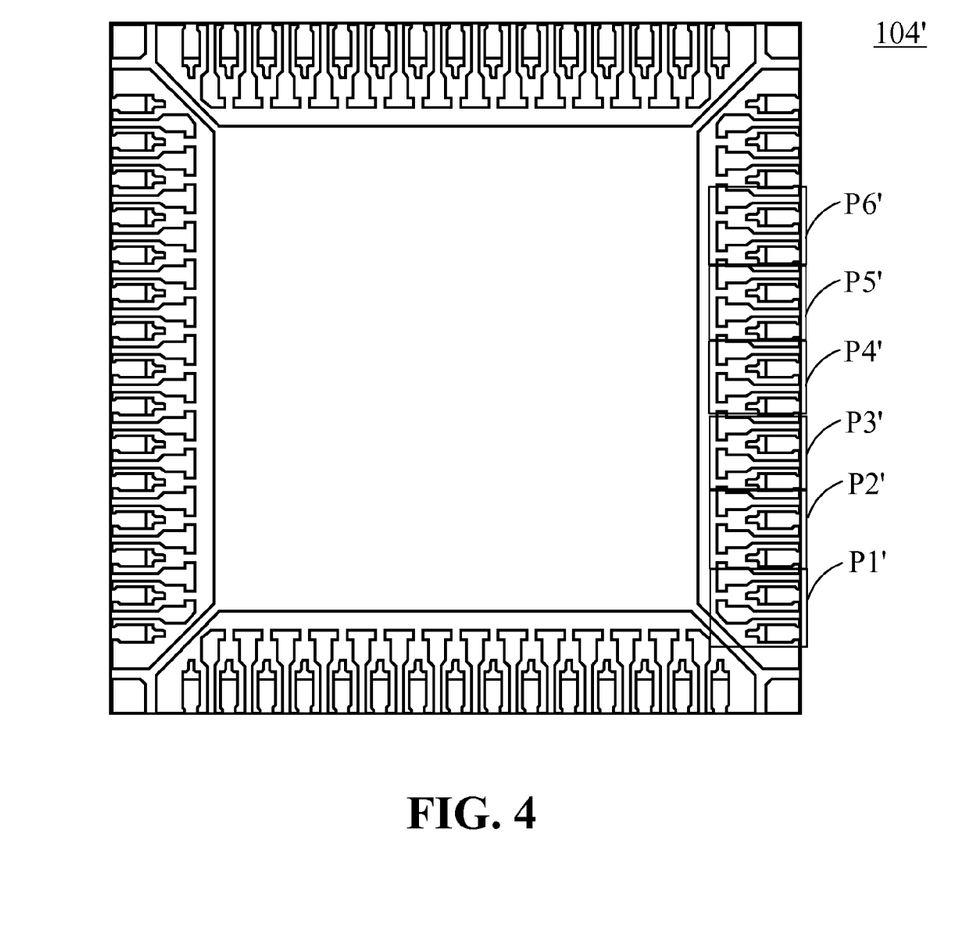
FIG. 4 illustrates a USB controller including two rows of pins in accordance with a second embodiment of the present invention.

Please refer to FIG. 1 and FIG. 4. FIG. 4 illustrates a pin arrangement of a lead frame package of a USB controller 104' in accordance with a second embodiment of the present invention. The USB controller 104' of the present embodiment is adapted for being electrically connected to the USB connecting port 112 with the Type-C interface of USB 3.1 standard. Pins of the USB controller 104' with the two-row lead frame in FIG. 4 are arranged in two rows including an inner row and an outer row. The USB controller 104 in FIG. 3A has only one row of pins.

The USB controller 104' comprises a first group of pins and a second group of pins. The first group of pins comprises a first set of pins P1' corresponding to the first set of transmitting signal contacts of the USB connecting port 112, a second set of pins P2' corresponding to the first set of receiving signal contacts of the USB connecting port 112, and a third set of pins P3' corresponding to the first set of differential signal contacts of the USB connecting port 112. The second group of pins comprises a fourth set of pins P4' corresponding to the second set of differential signal contacts of the USB connecting port 112, a fifth set of pins P5' corresponding to the second set of receiving signal contacts of the USB connecting port 112, and a sixth set of pins P6' corresponding to the second set of transmitting signal contacts of the USB connecting port 112.

Features of the present embodiment are that the first group of pins and the second group of pins are adjacently arranged in groups, each of the sets of the pins in each of the groups of pins are arranged in the inner row and the outer row, and two adjacent sets of pins are respectively corresponding to the connecting port signal contacts at different sides of the USB connecting port 112. For example, the USB controller 104' is a QFN package with two rows of pins. That is, each side of the USB controller 104' has two rows of pins. The pins corresponding to the USB connecting port 112, for example, are disposed at one of four sides of the USB controller 104'. As shown in FIG. 4, a sequence of the pins from down to up is the first set, the second set, and the third set of pins P1', P2', and P3' of the first group of pins, and the fourth set, the fifth set, and the sixth set of pins P4', P5', and P6' of the second group of pins. The first set of pins P1 are disposed at the inner row and the outer row of the QFN package. For example, GND is disposed at the outer row. TX1+ is disposed at the inner row. TX1− is disposed at the inner row. VBUS is disposed at the inner row. The second set of pins P2' is adjacent to the first set of pins P1', and the third set of pins P3', the fourth set of pins P4', the fifth set of pins P5', and the sixth set of pins P6' are continuously arranged. The second to the sixth sets of pins P2'-P6' are disposed at the inner row and the outer row as well. Two adjacent sets of pins are respectively corresponding to the connecting port signal contacts at different sides of the USB connecting port 112. For example, the third set of pins P3' and the fourth set of pins P4' are respectively corresponding to the A-side contacts A5-A8 and the B-side contacts B5-B8 of the USB connecting port 112.

Figure 5:
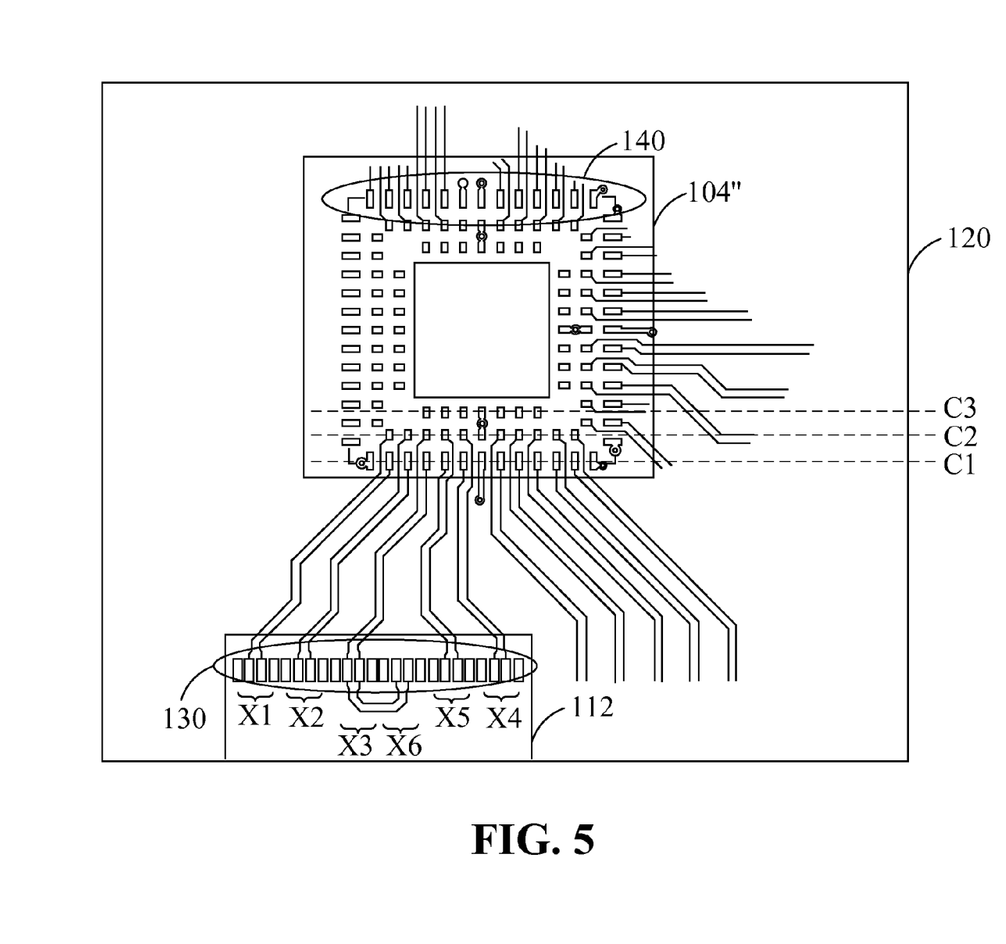
FIG. 5 illustrates a USB host and a USB controller including three rows of pins in accordance with a third embodiment of the present invention.

Please refer to FIG. 1 and FIG. 5. FIG. 5 illustrates a USB host in accordance with a third embodiment of the present invention. The USB host comprises a wiring substrate 120, a USB connecting port 112, and a USB controller 104". In the present embodiment, pins of the USB controller 104" are arranged in three rows and comprise a first group of pins and a second group of pins. Each of the groups of pins comprises a plurality of sets of pins, and each of the sets of pins comprises two controlling signal pins and two non-controlling signal pins. For example, the first set of pins comprises two controlling signal pins TX1+ and TX1− and two non-controlling signal pins GND and VBUS. A feature of the present embodiment is that all of the non-controlling signal pins, such as the ground pins GND and the power pins VBUS, are disposed at an inner row C3 closest to the center of the USB controller 104", and the controlling signal pins are disposed at outer rows C1 and C2 according to the pin arrangement of the above-mentioned embodiments.

The wiring substrate 120 comprises a plurality of first substrate contacts 130 and a plurality of substrate contacts 140. The USB connecting port 112 is electrically connected to the wiring substrate 120 via the first substrate contacts 130. The pins of the USB controller 104" are electrically connected to the wiring substrate 120 via the second substrate contacts 140. The first substrate contacts 130 are arranged in one row on the wiring substrate 120. The first substrate contacts 130 comprise a first group of substrate contacts and a second group of substrate contacts. The first group of substrate contacts comprises a first set of substrate contacts X1 corresponding to the first set of transmitting signal contacts (i.e. the A-side contacts A1-A4 in FIG. 1), a second set of substrate contacts X2 corresponding to the first set of receiving signal contacts (i.e. the B-side contacts B9-B12 in FIG. 1), and a third set of substrate contacts X3 corresponding to the first set of differential signal contacts (i.e. the A-side contacts A5-A8 in FIG. 1). The second group of substrate contacts comprises a fourth set of substrate contacts X4 corresponding to the second set of transmitting signal contacts (i.e. the B-side contacts B1-B4 in FIG. 1), a fifth set of substrate contacts X5 corresponding to the second set of receiving signal contacts (i.e. the A-side contacts A9-A12 in FIG. 1), and a sixth set of substrate contacts X6 corresponding to the second set of differential signal contacts (i.e. the B-side contacts B5-B8 in FIG. 1). The sets of substrate contacts are adjacently disposed in sets. Two adjacent sets of pins are respectively corresponding to the connecting port signal contacts at the first side and the second side of the flat board 1120 in FIG. 1.

Furthermore, it is noted that the USB controller 104 and 104' in the embodiments of FIG. 3A and FIG. 4 respectively comprise six sets of pins. In the present embodiment, the third set of substrate contacts X3 and the sixth set of substrate contacts X6 are short circuited so as to be shared. Accordingly, the USB controller 104" of the present embodiment only requires five sets of pins, and the five sets of pins are corresponding to the six sets of contacts of the USB connecting port 112, thereby decreasing the number of the pins of the USB controller 104".

The USB host of the present invention is capable of decreasing the interference among the signals when the USB host and the USB connecting port are utilized. Furthermore, the present invention is capable of avoiding the problem that the layout of the wiring substrate is too complicated and decreasing the manufacturing cost of the wiring substrate.

As is understood by a person skilled in the art, the foregoing preferred embodiments of the present invention are illustrative, rather than limiting of, the present invention.

It is intended that they cover various modifications, and similar arrangements can be included within the spirit and scope of the appended claims. For example, the substrate for supporting the USB controller chip may be a lead frame, a wiring substrate, a ceramic substrate, or a suitable package material. The scope of the appended claims should be accorded the broadest interpretation so as to encompass all such modifications and similar structures.

What is claimed is:

1. A universal serial bus controller, adapted for being electrically connected to a universal serial bus connecting port, the universal serial bus connecting port comprising a flat board and a first group of connecting port signal contacts and a second group of connecting port signal contacts which are respectively disposed at a first side and a second side of the flat board, the first group of connecting port signal contacts comprising a first set of transmitting signal contacts, a first set of receiving signal contacts, and a first set of differential signal contacts, the second group connecting port signal contacts comprising a second set of transmitting signal contacts, a second set of receiving signal contacts, and a second set of differential signal contacts, the universal serial bus controller comprising:
   a universal serial bus controller chip comprising a plurality of chip contacts; and
   a substrate for supporting the universal serial bus controller chip and comprising a plurality of pins electrically connected to the chip contacts, the pins comprising:
   a first group of pins, comprising:
      a first set of pins corresponding to the first set of transmitting signal contacts;
      a second set of pins corresponding to the first set of receiving signal contacts; and
      a third set of pins corresponding to the first set of differential signal contacts; and
   a second group of pins, comprising:
      a fourth set of pins corresponding to the second set of transmitting signal contacts;
      a fifth set of pins corresponding to the second set of receiving signal contacts; and
      a sixth set of pins corresponding to the second set of differential signal contacts,
   wherein the pins are arranged in one row, the first group of pins and the second group of pins are adjacently arranged in groups, the sets of pins in each of the first group and the second group of pins are adjacently arranged in sets, and two adjacent sets of pins are respectively corresponding to the connecting port signal contacts at the first side and the second side of the flat board,
   wherein some of the pins in the same group correspond to the first group of connecting port signal contacts, and others of the pins in the same group correspond to the second group of connecting port signal contacts.

2. The universal serial bus controller of claim 1, wherein the pins are arranged in one row at one side of the universal serial bus controller.

3. The universal serial bus controller of claim 1, wherein the pins are arranged in one row and surround four sides of the universal serial bus controller.

4. The universal serial bus controller of claim 1, wherein each of the sets of pins comprises two controlling signal pins and two non-controlling signal pins, and two adjacent pins in two adjacent sets of pins are the non-controlling signal pins.

5. The universal serial bus controller of claim 1, wherein a sequence of the sets of pins is the first set of pins, the second set of pins, the third set of pins, the fourth set of pins, the fifth set of pins, and the sixth set of pins.

6. The universal serial bus controller of claim 1, wherein a sequence of the sets of pins is the third set of pins, the second set of pins, the first set of pins, the sixth set of pins, the fifth set of pins, and the fourth set of pins.

7. The universal serial bus controller of claim 1, wherein the substrate is a lead frame or a wiring substrate.

8. A universal serial bus controller, adapted for being electrically connected to a universal serial bus connecting port, the universal serial bus connecting port comprising a flat board and a first group of connecting port signal contacts and a second group of connecting port signal contacts which are respectively disposed at a first side and a second side of the flat board, the first group of connecting port signal contacts comprising a first set of transmitting signal contacts, a first set of receiving signal contacts, and a first set of differential signal contacts, the second group of connecting port signal contacts comprising a second set of transmitting signal contacts, a second set of receiving signal contacts, and a second set of differential signal contacts, the universal serial bus controller comprising:
   a universal serial bus controller chip comprising a plurality of chip contacts; and
   a substrate for supporting the universal serial bus controller chip and comprising a plurality of pins electrically connected to the chip contacts, the pins comprising:
   a first group of pins, comprising:
      a first set of pins corresponding to the first set of transmitting signal contacts; and
      a second set of pins corresponding to the first set of receiving signal contacts;
      a third set of pins corresponding to the first set of differential signal contacts and the second set of differential signal contacts; and
   a second group of pins, comprising:
      a fourth set of pins corresponding to the second set of transmitting signal contacts; and
      a fifth set of pins corresponding to the second set of receiving signal contacts,
   wherein the third set of pins is disposed between the first group of pins and the second group of pins for separating the first group of pins from the second group of pins,
   wherein some of the pins in the same group correspond to the first group of connecting port signal contacts, and others of the pins in the same group correspond to the second group of connecting port signal contacts.

9. The universal serial bus controller of claim 8, wherein each of the sets of pins comprises two controlling signal pins and two non-controlling signal pins, and the controlling signal pins and the non-controlling signal pins are disposed in two rows at one side of the universal serial bus controller.

10. The universal serial bus controller of claim 8, wherein the pins comprise a plurality of controlling signal pins and a plurality of non-controlling signal pins, the controlling pins and the non-controlling pins are disposed in three rows at one side of the universal serial bus controller, and the non-controlling pins are disposed at one of the three rows closest to a center of the universal serial bus controller.

11. The universal serial bus controller of claim 8, wherein the substrate is a lead frame or a wiring substrate.

12. A wiring substrate, adapted for being electrically connected to a universal serial bus connecting port and a universal serial bus controller, the universal serial bus connecting port comprising a flat board and a plurality of connecting port signal contacts disposed at a first side and a second side of the flat board, the wiring substrate comprising:
- a plurality of first substrate contacts electrically connected to the universal serial bus connecting port, disposed in one row, and comprising a first set of substrate contacts, a second set of substrate contacts, a third set of substrate contacts, a fourth set of substrate of contacts, a fifth set of substrate contacts, and a sixth set of substrate contacts, wherein two adjacent sets of substrate contacts are respectively corresponding to the connecting port signal contacts at the first side and the second side of the flat; and
- a plurality of second substrate contacts electrically connected to the universal serial bus controller and corresponding to the first set substrate contacts, the second set substrate contacts, the third set of substrate contacts, the fourth set of substrate contacts, the fifth set of substrate contacts, and the sixth set of substrate contacts, wherein some of the pins in the same group correspond to the first group of connecting port signal contacts, and others of the pins in the same group correspond to the second group of connecting port signal contacts.

13. The wiring substrate of claim 12, wherein the third set of substrate contacts is electrically connected to the sixth set of substrate contacts.

14. The wiring substrate of claim 12, wherein the second substrate contacts are disposed in two rows.

15. The wiring substrate of claim 12, wherein the second substrate contacts are disposed in three rows.

16. The wiring substrate of claim 12, wherein the universal serial bus connecting port comprises a first set of differential signal contacts and a second set of differential signal contacts, the third set of substrate contacts is corresponding to the first set of differential signal contacts, the sixth set of substrate contacts is corresponding to the second set of differential signal contacts, and the second substrate contacts comprise a set of differential signal substrate contacts corresponding to the third set of substrate contacts and the sixth set of substrate contacts.

* * * * *